US012675276B2

(12) United States Patent　　　(10) Patent No.:　US 12,675,276 B2

Miyake　　　(45) Date of Patent:　Jul. 7, 2026

(54) SERVER AND NON-TRANSITORY COMPUTER-READABLE RECORDING MEDIUM STORING COMPUTER-READABLE INSTRUCTIONS FOR SERVER

(71) Applicant: BROTHER KOGYO KABUSHIKI KAISHA, Nagoya (JP)

(72) Inventor: Takeshi Miyake, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 306 days.

(21) Appl. No.: 18/439,084

(22) Filed: Feb. 12, 2024

(65) Prior Publication Data

US 2024/0281240 A1　Aug. 22, 2024

(30) Foreign Application Priority Data

Feb. 17, 2023　(JP) ................................ 2023-023629

(51) Int. Cl.
　　*G06F 8/65*　　　(2018.01)
　　*H04N 1/00*　　　(2006.01)
　　*H04N 1/32*　　　(2006.01)
(52) U.S. Cl.
　　CPC ........... *G06F 8/65* (2013.01); *H04N 1/00973* (2013.01); *H04N 1/32101* (2013.01)
(58) Field of Classification Search
　　CPC ... G06F 8/65; H04N 1/00973; H04N 1/32101
　　See application file for complete search history.

(56) References Cited

U.S. PATENT DOCUMENTS

| | | | | |
|---|---|---|---|---|
| 10,769,279 | B2 * | 9/2020 | Yang ...................... | G06F 21/572 |
| 11,323,317 | B1 * | 5/2022 | Levin ...................... | H04L 67/34 |
| 2008/0178171 | A1 | 7/2008 | Sueyoshi et al. | |
| 2016/0080601 | A1 * | 3/2016 | Miyazawa ......... | H04N 1/00244 |
| | | | | 358/1.13 |

(Continued)

FOREIGN PATENT DOCUMENTS

| | | |
|---|---|---|
| JP | 2008-181228 A | 8/2008 |
| JP | 2017-182466 A | 10/2017 |

*Primary Examiner* — Qian Yang
(74) *Attorney, Agent, or Firm* — Kenealy Vaidya LLP

(57) ABSTRACT

A server includes: a communication interface configured to communicate with a communication device; a memory configured to store server capability information indicating a communication capability of a service providing server configured to provide a predetermined service to the communication device and being different from the server; and a controller, wherein the controller is configured to: receive, from the communication device via the interface, device capability information indicating a communication capability of the communication device; determine whether a program stored in the communication device is to be updated by comparing the device capability information received from the communication device and the server capability information stored in the memory; and when it is determined that the program is to be updated, send first execution information to a first external device via the communication interface, the first execution information being for causing the communication device to execute a process of updating the program.

18 Claims, 6 Drawing Sheets

(56)                References Cited

U.S. PATENT DOCUMENTS

2016/0253161 A1*  9/2016  Kubota  ................... H04L 67/06
                                                          717/178
2017/0289275 A1*  10/2017  Saito  .................. H04W 12/068
2017/0289276 A1    10/2017  Nagasaki
2018/0309897 A1*  10/2018  Saito  ................. H04N 1/32101
2019/0268499 A1*  8/2019  Ishibashi  ........... H04W 12/0431
2020/0045204 A1*  2/2020  Niimoto  ............... H04N 1/4426
2020/0099819 A1*  3/2020  Shiraki  ............. H04N 1/33346

* cited by examiner (Case C1: Updating Process)

FIG. 4

(Cace C2 to C4: Changing Process)

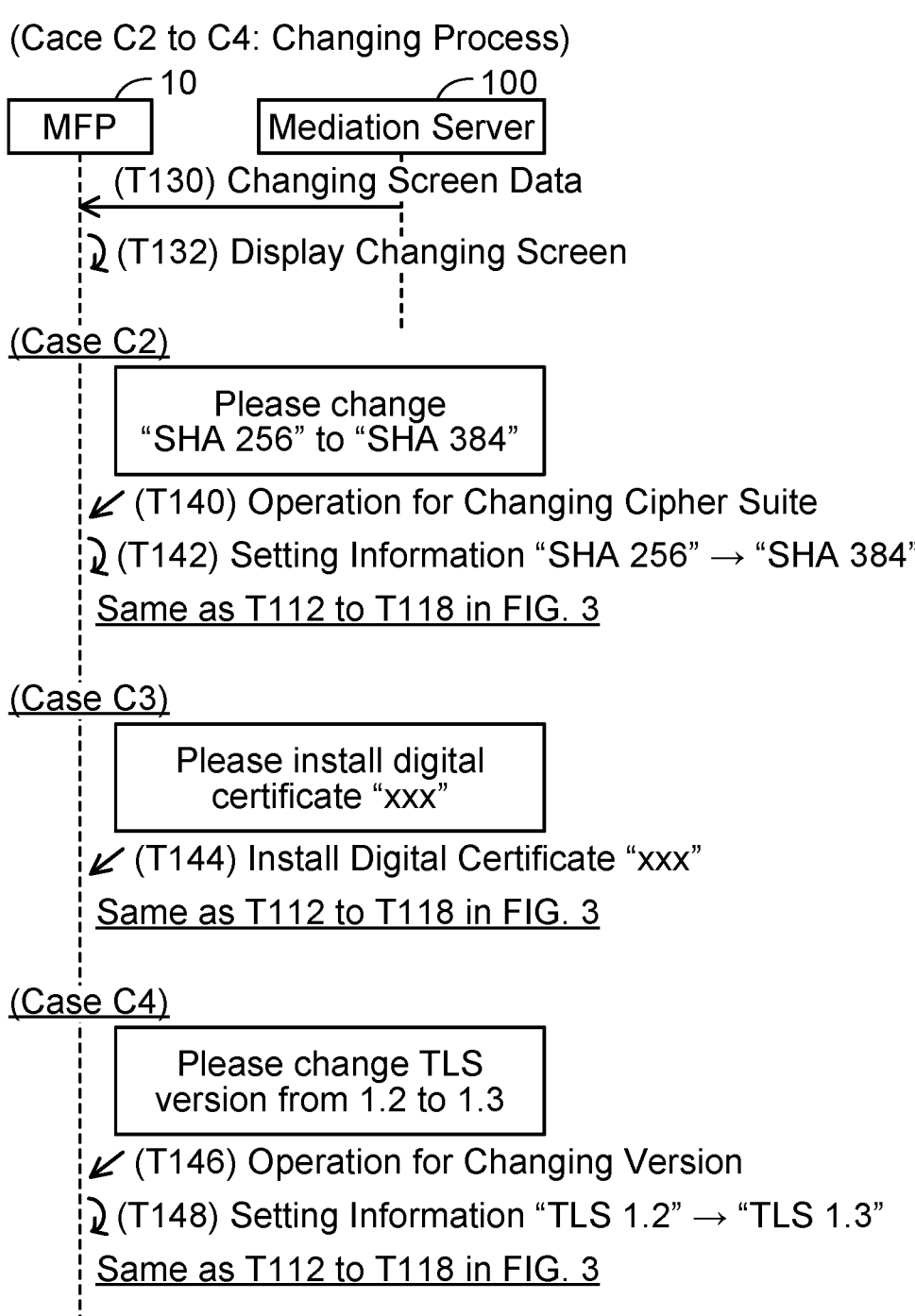

(Case C2)

Please change
"SHA 256" to "SHA 384"

(T140) Operation for Changing Cipher Suite (T142) Setting Information "SHA 256" → "SHA 384"

Same as T112 to T118 in FIG. 3

(Case C3)

Please install digital
certificate "xxx"

(T144) Install Digital Certificate "xxx"

Same as T112 to T118 in FIG. 3

(Case C4)

Please change TLS
version from 1.2 to 1.3

(T146) Operation for Changing Version (T148) Setting Information "TLS 1.2" → "TLS 1.3"

Same as T112 to T118 in FIG. 3

(Case C5: Communication Substitute Process)

(Second Embodiment)

SERVER AND NON-TRANSITORY COMPUTER-READABLE RECORDING MEDIUM STORING COMPUTER-READABLE INSTRUCTIONS FOR SERVER

REFERENCE TO RELATED APPLICATION

This application claims priority from Japanese Patent Application No. 2023-023629 filed on Feb. 17, 2023. The entire content of the priority application is incorporated herein by reference.

BACKGROUND ART

A mediation server configured to mediate service provision from a service providing server to a communication device is known.

SUMMARY

The present teachings provide a technology for a communication device to suitably receive a service from a service providing server.

A server disclosed herein may comprise: a communication interface configured to communicate with a communication device; a memory configured to store server capability information indicating a communication capability of a service providing server, the service providing server being configured to provide a predetermined service to the communication device and being different from the server; and a controller configured to: receive, from the communication device via the communication interface, device capability information indicating a communication capability of the communication device; determining whether a program stored in the communication device is to be updated by comparing the device capability information received from the communication device and the server capability information stored in the memory; and in a case where it is determined that the program is to be updated, send first execution information to a first external device via the communication interface, the first execution information being for causing the communication device to execute a process of updating the program.

According to the above configuration, the communication device can suitably receive a service from the service providing server by the program of the communication device being updated. In particular, whether to update the program can be suitably determined by comparing the device capability information and the server capability information.

The other server disclosed herein may comprise: a communication interface configured to communicate with a communication device; a memory configured to store server capability information indicating a communication capability of a service providing server, the service providing server being configured to provide a predetermined service to the communication device and being different from the server; and a controller configured to: in a case where a predetermined communication between the communication device and the service providing server fails, receive, from the communication device via the communication interface, device capability information indicating a communication capability of the communication device; determine whether a specific method for the communication device communicating with the service providing server is to be executed by comparing the device capability information received from the communication device and the server capability information stored in the memory; and in a case where it is determined that the specific method is to be executed, send execution information to an external device via the communication interface, the execution information being for causing the communication device to execute the specific method.

According to the above configuration, the communication device can suitably receive a service from the service providing server by execution of the specific method. In particular, whether to execute the specific method can be suitably determined by comparing the device capability information and the server capability information.

A computer program for realizing the above server and a computer-readable recording medium storing the above computer program are also novel and useful. A control method for the above server is also novel and useful. A communication system comprising the above server and the above communication device is also novel and useful.

BRIEF DESCRIPTION OF DRAWINGS

FIG. 4 illustrates a sequence diagram showing a changing process.

DESCRIPTION

First Embodiment

Figure 1:
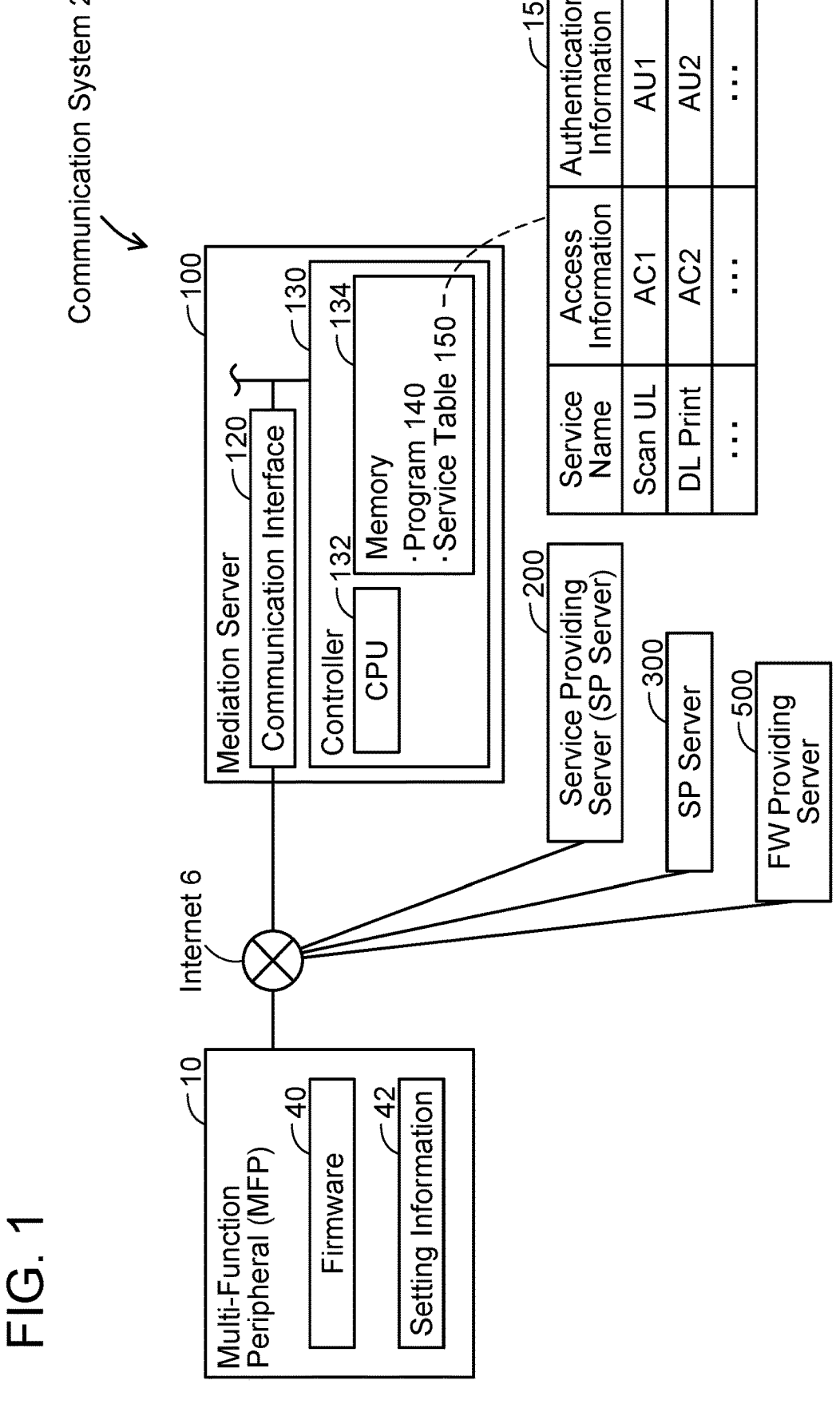
FIG. 1 illustrates a block diagram of a communication system.

Configuration of Communication System 2; FIG. 1

A communication system 2 comprises a multi-function peripheral 10, a mediation server 100, a service providing server 200, a service providing server 300, and a firmware providing server 500. Hereafter, "multi-function peripheral" will be referred to as "MFP", "service providing server" will be referred to as "SP server", and "firmware" will be referred to as "FW". The MFP 10 is configured to communicate with the respective devices 100, 200, 300, and 500 via the Internet 6.

Configuration of MFP 10

The MFP 10 is a peripheral device (e.g., a peripheral device of a PC) configured to perform multiple functions including a print function and a scan function. The MFP 10 has a FW 40 and setting information 42 stored therein. The FW 40 is a program configured to control operation of the MFP 10. The setting information 42 is information indicating a plurality of settings of the MFP 10. The plurality of settings may include, for example, a communication setting which the MFP 10 is currently using for communicating with an external device (e.g., SP server 200). The communication setting may comprise, for example, a version of the FW 40, a version of a communication protocol, a cipher suite, and a digital certificate. Here, the communication protocol is for example Secure Socket Layer (SSL), Transport Layer Security (TLS). The cipher suite indicates, for example, an encryption algorithm, a hash function, a length of a key used for encryption. The encryption algorithm is for example Elliptic Curve Diffie-Hellman Key Exchange (ECDHE), RSA, Diffie-Hellman key exchange (DHE). The hash function is used for digital signature, and is for example SHA1, SHA256, SHA384. The digital certificate is issued by a certificate authority (CA).

Configurations of SP Servers 200, 300

Each of the SP servers 200, 300 is a known third-party server of "Evernote ("Evernote" is a registered trademark of Bending Spoons S.p.A.)", "Google ("Google" is a registered trademark of Google LLC) Drive", "FACEBOOK ("FACE-BOOK" is a registered trademark of Meta Platforms, Inc.)". Each of the SP servers 200, 300 is configured to provide a service to various communication devices including the MFP 10.

Configuration of FW Providing Server 500

The FW providing server 500 is set up on the Internet 6 by a vendor of the MFP 10. The vendor updates a latest FW to the FW providing server 500. The MFP 10 updates the FW 40 in the MFP 10 by downloading the latest FW from the FW providing server 500.

Configuration of Mediation Server 100

The mediation server 100 is set up on the Internet 6 by the vendor of the MFP 10, and configured to mediate communication between each of the SP servers 200, 300 and the MFP 10. The mediation server 100 comprises a communication interface 120 and a controller 130. Hereafter, "interface" will be referred to as "I/F". The communication I/F 120 is connected to the Internet 6.

The controller 130 comprises a CPU 132 and a memory 134. The memory 134 has a program 140 and a service table 150 stored therein. The CPU 132 is configured to execute various processes in accordance with the program 140 stored in the memory 134.

The service table 150 has information for mediating communication with a plurality of SP servers stored therein. The service table 150 stores, for each of the plurality of SP servers, a service name provided by the SP server, access information for accessing the SP server, and authentication information for logging into the SP server in association with each other. The access information includes, for example, a URL of a SP server. The authentication information includes, for example, an access token provided by an SP server in OAuth authentication. In a modification, the authentication information may include an account name and a password.

For example, the service name "Scan UL" is a service which is provided by the SP server 200 and uploads scan data generated by the MFP 10 to the SP server 200. Also, a service name "DL Print" is a service which is provided by the SP server 300 and causes the MFP 10 to print an image corresponding to image data downloaded from the SP server 300.

Figure 2:
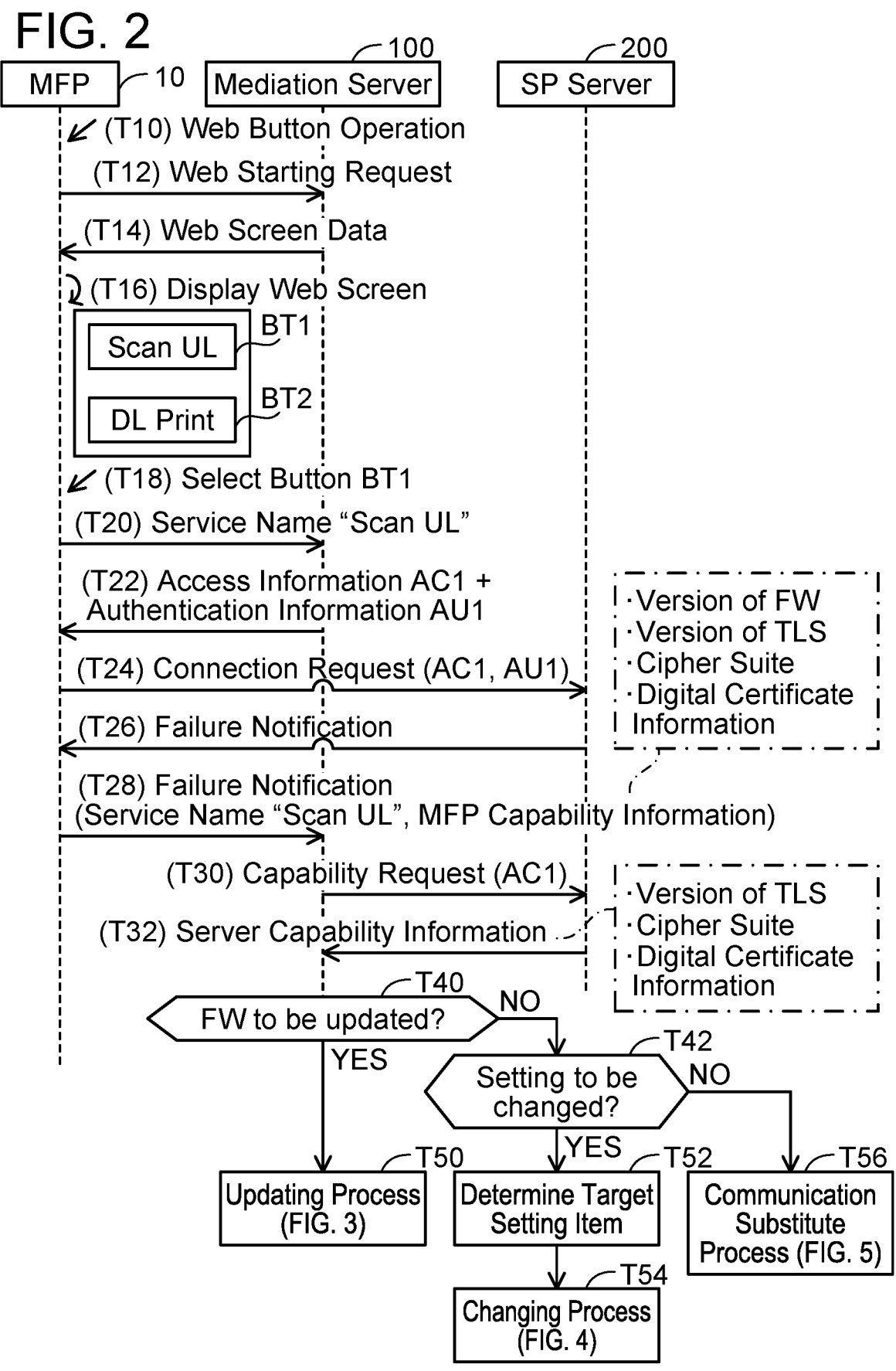
FIG. 2 illustrates a sequence diagram showing processes realized by a communication system.

Processes Realized by Communication System 2; FIG. 2

With reference to FIG. 2, processes realized by the communication system 2 will be described. Hereafter, when process executed by the CPU 132 is described, the process is described with the mediation server 100 as a subject of action, without describing the CPU 132 as a subject of action, for easier understanding. Further, communication between the mediation server 100 and another device is executed via the communication I/F 120 and the Internet 6, unless stated otherwise. Accordingly, when the communication between the mediation server 100 and another device is described, descriptions such as "via the communication I/F" and "via the Internet 6" may be omitted.

In T10, a user operates a predetermined Web button of the MFP 10. The Web button is a button for accessing the mediation server 100. When the MFP 10 detects the operation of the Web button in T10, in T12 the MFP 10 sends a Web starting request to the mediation server 100.

When the mediation server 100 receives the Web starting request from the MFP 10 in T12, in T14 the mediation server 100 sends Web screen data corresponding to a Web screen to the MFP 10. The Web screen is a screen for selecting a specific service name from among a plurality of service names stored in the service table 150.

When the MFP 10 has received the Web screen data from the mediation server 100 in T14, in T16 the MFP 10 displays the Web screen. In the present case, the Web screen includes a button BT1 for selecting the service name "Scan UL" and a button BT2 for selecting the service name "DL Print". In the present case, the user selects the button BT1 in T18.

When the MFP 10 detects selection of the button BT1 in T18, in T20 the MFP 10 sends the service name "Scan UL" corresponding to the button BT1 to the mediation server 100.

When the mediation server 100 has received the service name "Scan UL" from the MFP 10 in T20, the mediation server 100 obtains, from the service table 150, information stored in association with the service name "Scan UL", that is, access information AC1 and authentication information AU1. Here, the access information AC1 includes a URL of the SP server 200, and the authentication information AU1 includes an access token for logging into the SP server 200.

In T22, the mediation server 100 sends the access information AC1 and the authentication information AU1 to the MFP 10.

When the MFP 10 receives the access information AC1 and the authentication information AU1 from the mediation server 100 in T22, in T24 the MFP 10 sends a connection request to the SP server 200. The connection request is a request for establishing a connection according to TLS (hereafter, "TLS connection") between the MFP 10 and the SP server 200. The connection request includes the access information AC1 and the authentication information AU1.

When the SP server 200 receives the connection request from the MFP 10 in T24, the SP server 200 attempts to establish a TLS connection with the MFP 10 in accordance with the connection request. If the TLS connection with the MFP 10 is successfully established, the SP server 200 uses this TLS connection to receive scan data from the MFP 10 and stores the scan data. The scan data is stored in association with an account name indicative of the user of the MFP 10. Due to this, a service indicated by the service name "Scan UL" is provided to the user. Further, if the MFP 10 is to use the service of the SP server 300, the MFP 10 uses the TLS connection to receive print data from the SP server 300, and executes print in accordance with the print data. Due to this, the service indicated by the service name "DL Print" is provided to the user.

Also, there may be a case where the TLS connection between the SP server 200 and the MFP 10 fails to be established. The SP server 200 is managed by a third party. For this reason, a communication capability of the SP server 200 may be changed while the user of the MFP 10 does not notice. When the communication capability of the SP server 200 is changed, a signal sent from the MFP 10 to the SP server 200 may not be compatible with the communication capability as changed of the SP server 200. In this case, the TLS connection fails to be established. In the present case, establishment of the TLS connection fails, and in T26 the SP server 200 sends a failure notification indicative of failure in establishing the TLS connection to the MFP 10. Alternatively in a modification, the SP server 200 may not send the failure notification to the MFP 10. In this case, for example, when a predetermined duration lapses without receiving a response to the connection request of T24 from the SP server 200, the MFP 10 may determine that establishment of the TLS connection has failed.

When the MFP 10 receives the failure notification from the SP server 200 in T26, in T28 the MFP 10 sends a failure notification to the mediation server 100. The failure notification which the MFP 10 sends includes the service name "Scan UL" and MFP capability information. The MFP capability information indicates a current communication capability of the MFP 10. The MFP capability information includes, for example, a version of the FW 40 currently stored in the MFP 10 and information indicating the setting information 42 currently stored in the MFP 10. The information indicating the setting information 42 includes, for example, a version of TLS, a cipher suite, and digital certificate information. The digital certificate information here may be a digital certificate itself, and/or may be information identifying a digital certificate.

When the mediation server 100 receives the failure notification from the MFP 10 in T26, in T30 the mediation server 100 sends a capability request to the SP server 200. The capability request is a signal requesting for server capability information indicating a current communication capability of the SP server 200. The capability request includes the access information AC1.

When the SP server 200 receives the capability request from the mediation server 100 in T30, in T32 the SP server 200 sends the server capability information to the mediation server 100. The server capability information indicates a communication capability of the SP server 200, and for example may include a version of TLS, a cipher suite, and digital certificate information.

When the mediation server 100 receives the server capability information from the SP server 200 in T32, the mediation server 100 causes the memory 134 to store this server capability information. In the present embodiment, the mediation server 100 compares the MFP capability information received in T26 and the server capability information received in T32 and select one method from among a plurality of methods for the MFP 10 establishing a connection with the SP server 200. The plurality of methods is methods to be described later and shown in FIGS. 3 to 5. A method which suits a current situation can be selected from among the plurality of methods.

In T40, the mediation server 100 compares the MFP capability information and the server capability information, and then determines whether to update the FW 40 in the MFP 10. For example, a situation in which the FW 40 version indicated by the MFP capability information is 3.0 and the TLS version which a FW of version 3.0 supports is 1.2 or less may be assumed. If in such situation the TLS version included in the server capability information is 1.3, the MFP 10 cannot establish a connection with the SP server 200. In the meantime, a situation in which currently the FW providing server 500 provides a FW of latest version 4.0 and the FW of version 4.0 supports TLS of version 1.3 may be assumed. By comparing the MFP capability information and the server capability information, it can be determined that the cause of failure in connection establishment can be resolved if the FW 40 in the MFP 10 is updated.

In a case where the mediation server 100 determines that the FW 40 in the MFP 10 is to be updated (YES to T40), the mediation server 100 executes an updating process in T50 (see FIG. 3) for updating the FW 40 in the MFP 10.

Also, for example, a situation where the version of the FW 40 in the MFP 10 is the latest version or a situation where the FW of the latest version does not support the communication capability indicated by the server capability information may be assumed. In these cases, the mediation server 100 determines that the FW 40 in the MFP 10 is not to be updated (NO to T40) and proceeds to T42.

In T42, the mediation server 100 compares the MFP capability information and the server capability information and determines whether to change the setting information 42 in the MFP 10. For example, a situation where the version of the FW 40 in the MFP 10 is the latest 4.0 and the FW of the latest version supports the communication capability indicated by the server capability information but the communication capability indicated by the MFP capability information is not compatible with the communication capability indicated by the server capability information may be assumed. The communication capability of the MFP 10 is not compatible with the communication capability of the SP server 200 for example in a case where the TLS version of the MFP 10 indicated by the setting information 42 is older than a version indicated by the server capability information, or in a case where the cipher suite of the MFP 10 indicated by the setting information 42 of the MFP 10 does not match the cipher suite indicated by the server capability information. In this case, the mediation server 100 determines that the setting information 42 in the MFP 10 is to be changed.

In a case where the mediation server 100 determines that the setting information 42 in the MFP 10 is to be changed (YES to T42), the mediation server 100 compares the MFP capability information and the server capability information, and determines setting item(s) to be changed (hereafter, "target setting item") and setting value(s) to be set of the setting item(s) from among the setting information 42 in T52. The mediation server 100 may determine one single target setting item or determine a plurality of target setting items. In subsequent T54, the mediation server 100 executes a changing process for changing target setting item(s) in the MFP 10 (see FIG. 4).

Also, a situation where although the FW 40 in the MFP 10 is of the latest version, the FW of the latest version does not support the communication capability indicated by the server capability information may be assumed. In this case, the mediation server 100 determines that the setting information 42 in the MFP 10 is not to be changed (NO to T42), and the mediation server 100 executes a substitute communication process in T56 (FIG. 5) for causing the mediation server 100 to be a substitute for communicating with the SP server 200.

Figure 3:
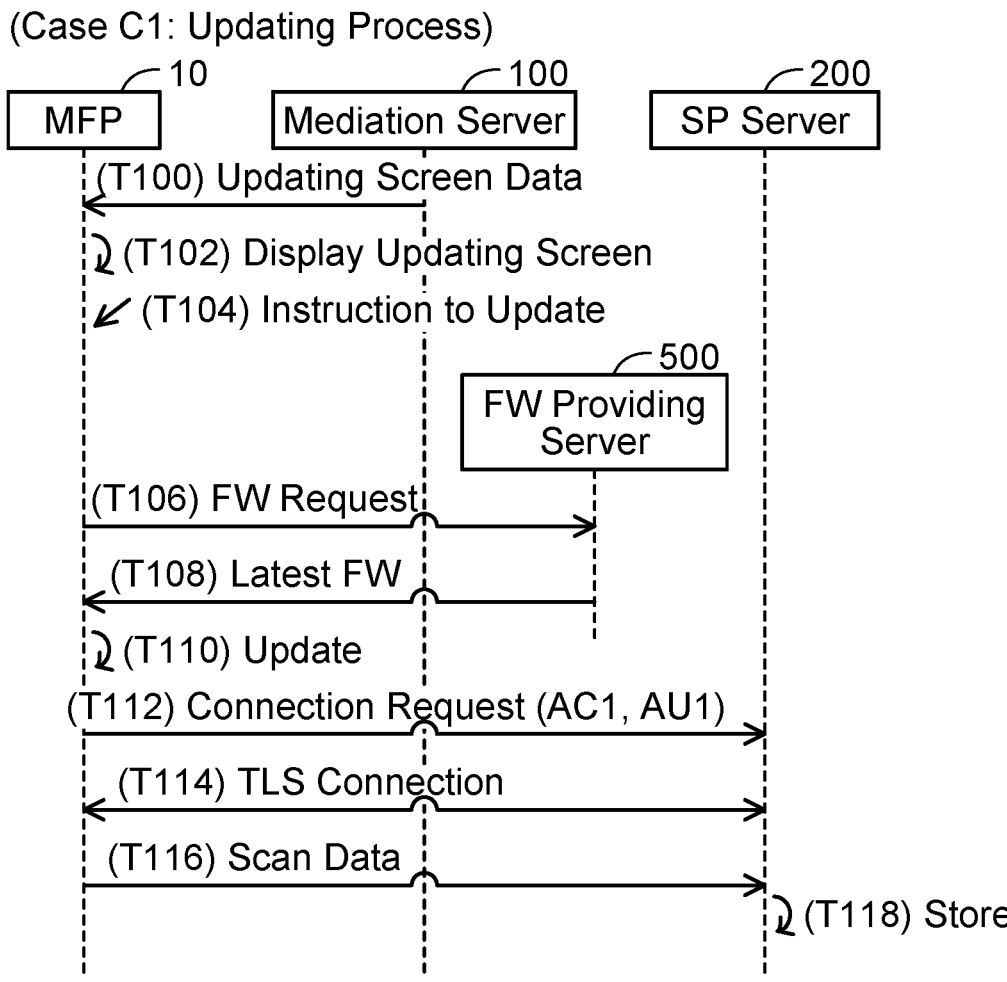
FIG. 3 illustrates a sequence diagram showing an updating process.

Updating Process; FIG. 3

FIG. 3 indicates Case C1 where the updating process is executed in T50 of FIG. 2. In T100, the mediation server 100 sends updating screen data corresponding to an updating screen to the MFP 10. The updating screen is a screen for guiding the user about update of the FW 40.

When the MFP 10 receives the updating screen data from the mediation server 100 in T100, the MFP 10 displays the updating screen in T102. The user sees the updating screen and inputs an instruction for updating the FW 40 into the MFP 10 in T104.

When the MFP 10 detects instruction for updating in T104, the MFP 10 sends a FW request which requests for a latest FW to the FW providing server 500 in T106. Due to this, the MFP 10 receives the latest FW from the FW providing server 500 in T108.

In T110, the MFP 10 updates the FW 40 by installing the latest FW received from the FW providing server 500.

T112 is the same as T24 in FIG. 2. In the present case, since the FW 40 has been updated to the latest FW, the TLS connection according to the connection request is successfully established in T114.

In T116, the MFP 10 sends scan data to the SP server 200 by using the TLS connection of T114. Due to this, in T118 the SP server 200 stores the scan data received from the MFP 10.

Changing Process; FIG. 4

FIG. 4 shows Cases C2 to C4 in which a changing process is performed in T54 of FIG. 2. In T130, the mediation server 100 sends changing screen data corresponding to a changing screen to the MFP 10. The changing screen is a screen for guiding the user about change of the setting information 42. The changing screen data includes information determined in T52 of FIG. 2, that is, the target setting item(s) and setting value(s).

When the MFP 10 receives the changing screen data from the mediation server 100 in T130, in T132 the MFP 10 displays the changing screen. A content of the changing screen varies according to contents of the target setting item(s) and setting value(s) included in the changing screen data.

In Case C2, the target setting item is a hash function. In the present case, the changing screen data includes a name of the hash function compatible with the communication capability of the SP server 200. For example, the changing screen includes a message indicating a guide for changing a hash function "SHA256" in the setting information 42 to a hash function indicated by a name "SHA384" included in the changing screen data. In T140, by looking at the changing screen, the user executes an operation for changing a setting value regarding the cipher suite among the setting information 42 of the MFP 10.

When the MFP 10 detects operation for changing the setting value regarding the cipher suite in T140, in T142 the MFP 10 changes the target setting item "hash function" among the setting information 42 from "SHA256" to "SHA384". Then the MFP 10 executes processes same as T112 to T118 of FIG. 3. Due to this, similar to FIG. 3, the TLS connection is successfully established, and the scan data is sent to the SP server 200.

In Case C3, the target setting item is a digital certificate. In the present case, the changing screen data includes a name of a digital certificate compatible with the communication capability of the SP server 200. For example, the changing screen includes a message indicating a guide for changing the digital certificate in the setting information 42 to another digital certificate indicated by a name "xxx" included in the changing screen data. The user sees the changing screen and, by operating another terminal device different from the MFP 10, accesses a CA which issues a digital certificate "xxx" and downloads the digital certificate "xxx" from the CA. In T144, the user executes an operation for installing the digital certificate "xxx" downloaded from the CA in the MFP 10. The installation hereof is performed by using a storage medium such as a memory card.

When the installation of the digital certificate "xxx" has finished in T144, the MFP 10 executes processes the same as T112 to T118 of FIG. 3. Due to this, similar to FIG. 3, the TLS connection is successfully established, and the scan data is sent to the SP server 200.

In Case C4, the target setting item is a version of TLS. In the present case, the changing screen data includes a TLS version compatible with the communication capability of the SP server 200. For example, the changing screen includes a message indicating a guide for changing the TLS version 1.2 in the setting information 42 to version 1.3 included in the changing screen data. In the present case, a situation where although a program using TLS of version 1.2 and a program using TLS of version 1.3 have been both installed in the MFP 10, currently TLS of version 1.2 is being used may be assumed. In T146, the user sees the changing screen and executes an operation for changing the TLS version in the setting information 42 of the MFP 10.

When the MFP 10 detects operation for changing the TLS version in T146, the MFP 10 changes the target setting item "version of TLS" from "1.2" to "1.3" among the setting information 42 in T148. Then, the MFP 10 executes processes the same as T112 to T118 of FIG. 3. Due to this, similar to FIG. 3, the TLS connection is successfully established, and the scan data is sent to the SP server 200.

Figure 5:
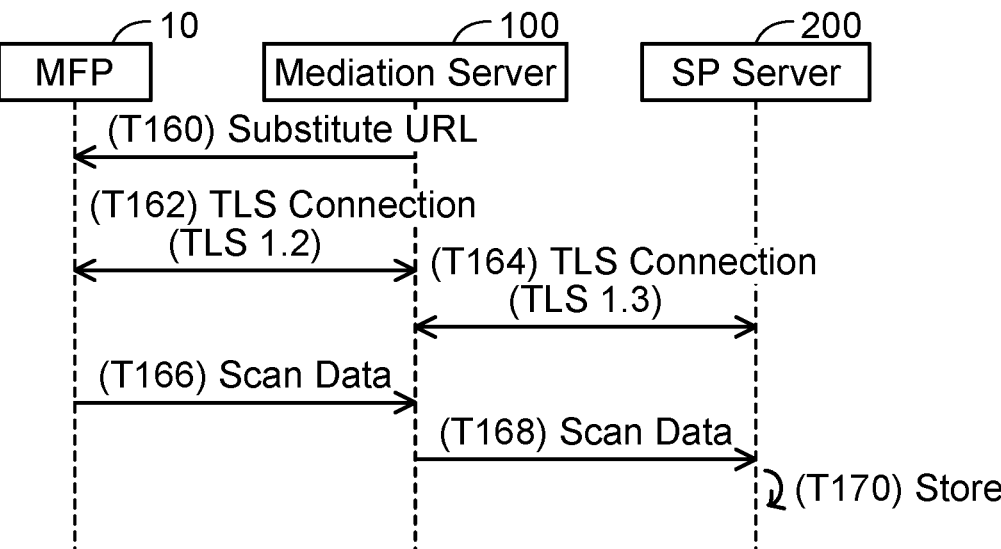
FIG. 5 illustrates a sequence diagram showing a communication substitute process.

Communication Substitute Process; FIG. 5

FIG. 5 shows Case C5 in which a communication substitute process is performed in T56 of FIG. 2. In the present case, NO is determined to T42 of FIG. 2 due to the latest FW not supporting the TLS version indicated by the server capability information. In T160, the mediation server 100 sends a substitute URL to the MFP 10. The substitute URL is a URL for the MFP 10 communicating with the SP server 200 via the mediation server 100. The substitute URL indicates a predetermined folder path in the mediation server 100.

When the MFP 10 receives the substitute URL from the mediation server 100 in T160, in T162 the MFP 10 uses the substitute URL and establishes the TLS connection with the mediation server 100. This TLS connection is a connection according to TLS of version 1.2 which the FW 40 of the MFP 10 supports, for example.

When the mediation server 100 establishes the TLS connection with the MFP 10 in T162, in T164 the mediation server 100 establishes TLS connection with the SP server 200. This TLS connection is a connection according to TLS of version 1.3 compatible with the server capability information of the SP server 200.

In T166, the MFP 10 uses the TLS connection established in T162 and sends the scan data to the mediation server 100.

In T168, the mediation server 100 uses the TLS connection established in T164, and sends the scan data received from the MFP 10 in T166 to the SP server 200. Due to this, in T170, the SP server 200 stores the scan data received from the MFP 10 via the mediation server 100.

Effects of Present Embodiment

In the present embodiment, the mediation server 100 compares the MFP capability information received from the MFP 10 and the server capability information received from the SP server 200 and then correctly determines whether to update the FW 40 (YES to T40, T50 of FIG. 2).

Further in a case where it is determined that the FW 40 is not to be updated, the mediation server 100 can compare the MFP capability information received from the MFP 10 and the server capability information received from the SP server 200, and correctly determine whether to change the setting information 42 (YES to T42, T52, T54 of FIG. 2).

Also, in cases where communication cannot be intermediated between the MFP 10 and the SP server 200 despite updating the FW 40 or changing the setting information 42, the communication substitute process can be used so as to intermediate the communication between the MFP 10 and the SP server 200. Even in such cases where the communication cannot be intermediated between the MFP 10 and the SP server 200 despite updating the FW 40 or changing the setting information 42, the service of the SP server 200 can still be used.

In a case where the TLS connection between the MFP 10 and the SP server 200 fails to be established (T26), the mediation server 100 receives the server capability information from the SP server 200 (T32). The mediation server 100 can know the latest server capability information at the time when establishment of the TLS connection fails. The determination of T40 and T42 can be correctly performed by using the latest server capability information.

Correspondence Relationship

The mediation server 100, the communication I/F 120, and the memory 134 are examples of "server", "communication interface", and "memory". The MFP 10 is an example of "communication device". The SP server 200 or 300 is an example of "service providing server". The MFP 10 is an example of "first external device" and "second external device". The updating screen in T102 of FIG. 3 is an example of "screen". The updating screen data in T100 of FIG. 3 is an example of "first execution information". The changing screen data in T130 of FIG. 4 is an example of "second execution information". T50, T54, and T56 of FIG. 2 are an example of "plurality of methods". One of T50, T54, and T56 of FIG. 2 is an example of "specific method". One of the updating screen data in T100 of FIG. 3 and the changing screen data in T130 of FIG. 4, and the substitute URL in T160 of FIG. 5 is an example of "execution information". The service name is an example of "service identification information". Communication for establishing the TLS connection is an example of "predetermined communication".

T28 of FIG. 2, T40 of FIGS. 2, and T100 of FIG. 3 are respectively an example of "receive, from the communication device via the communication interface, device capability information", "determine whether a program stored in the communication device is to be updated by comparing the device capability information received from the communication device and the server capability information stored in the memory", "send first execution information to a first external device via the communication interface". T40 and T42 of FIG. 2 are an example of process realized by "determine whether a specific method for the communication device communicating with the service providing server is to be executed by comparing the device capability information received from the communication device and the server capability information stored in the memory". One of T100 of FIG. 3, T130 of FIG. 4, and T160 of FIG. 5 is an example of process realized by "send execution information to an external device via the communication interface".

Second Embodiment

Figure 6:
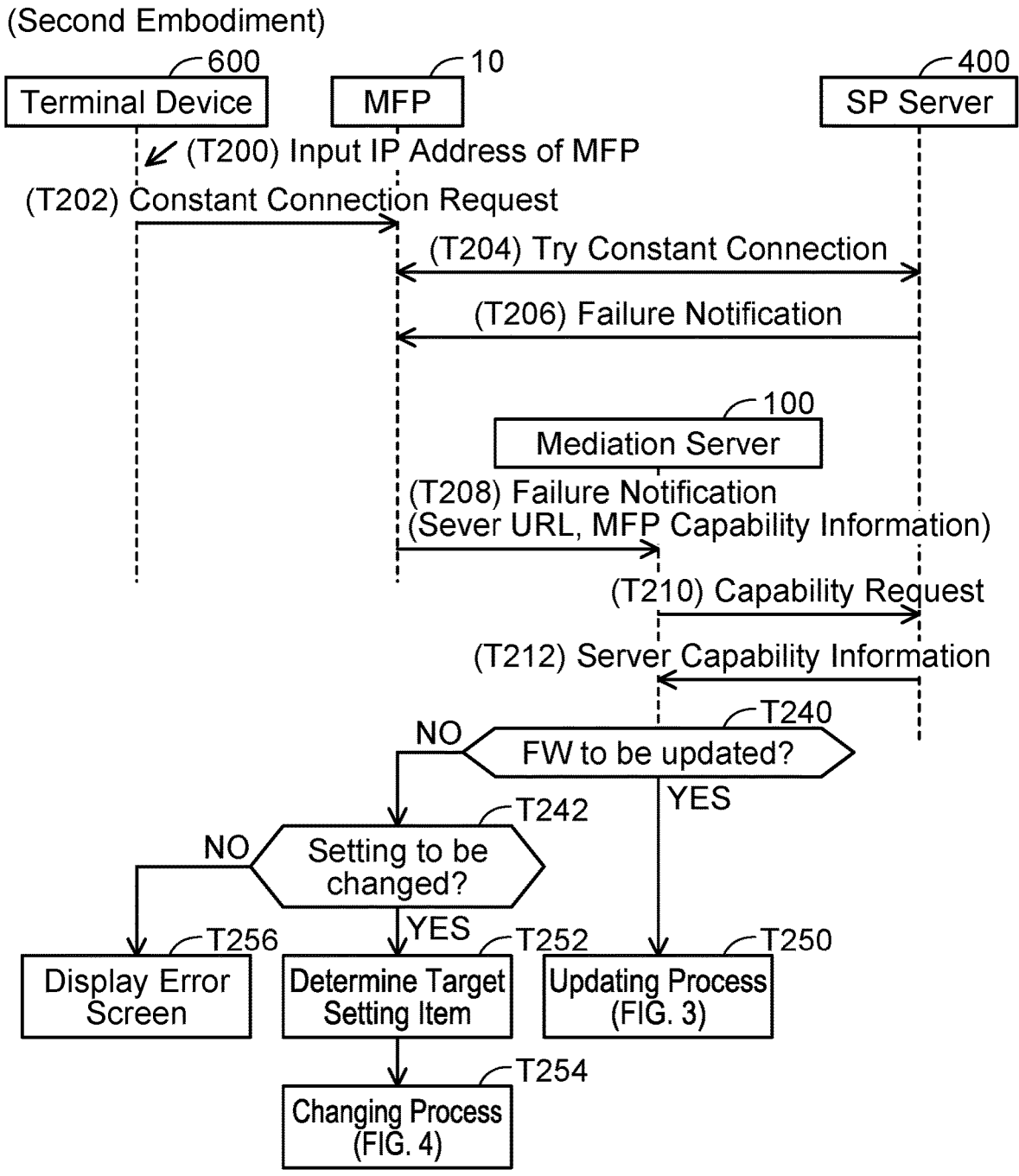
FIG. 6 illustrates a sequence diagram showing processes realized by a communication system.

Processes Realized by Communication System 2; FIG. 6

The present embodiment is an example where the art of the first embodiment is applied to a case where communication with another SP server 400 different from the SP servers 200, 300 fails. The SP server 400 has a full-time connection established with the MFP 10 and receives status information indicating a status of the MFP 10. The SP server 400 provides a predetermined service using the status information received from the MFP 10 to the user. The status information may comprise, for example, an accumulated printed number of sheets, a remaining amount of color material. The service provided by the SP server 400 may comprise, for example, monitoring of the status of the MFP 10, automatic delivery of color cartridge(s), and use of the MFP 10 at a fixed rate. The full-time connection may be for example of a connection according to Extensible Messaging and Presence Protocol (XMPP).

Process of FIG. 6 is for starting to use a service provided by the SP server 400. Firstly, the user operates a terminal device 600 which is for example a PC and thus accesses the MFP 10. Specifically, the user inputs an IP address of the MFP 10 into the terminal device 600 in T200. Due to this, the terminal device 600 displays a setting screen for changing various settings of the MFP 10.

When an operation for starting to use the service provided by the SP server 400 is inputted to the setting screen, the terminal device 600 sends a full-time connection request which requests for establishing a full-time connection with the SP server 400 to the MFP 10 in T202.

When the MFP 10 receives the full-time connection request from the terminal device 600 in T202, the MFP 10 executes communication for establishing a full-time connection with the SP server 400 in T204. This communication may comprise for example sending a serial number of the MFP 10. If the full-time connection is successfully established, the provision of the service by the SP server 400 is started.

In the present case, due to the communication capability of the MFP 10 not being compatible with the communication capability of the SP server 400, the full-time connection between the MFP 10 and the SP server 400 fails to be established. In this case, the SP server 400 sends a failure notification indicating that the full-time connection failed to be established to the MFP 10. Alternatively in a modification the SP server 400 may not send the failure notification to the MFP 10. In this case, in a case where a predetermined duration elapses without a full-time connection according to the communication of T204 being established, the MFP 10 may determine that the full-time connection failed to be established.

T208 is the same as T28 of FIG. 2 except that the failure notification includes a server URL which is a URL of the SP server 400. T210 is the same as T30 of FIG. 2 except that the server URL of the SP server 400 is used. T212 is the same as T32 of FIG. 2 except that the server capability information of the SP server 400 is received. T240, T242, and T250 to T254 are the same as T40, T42, and T50 to T54 of FIG. 2.

In the present embodiment, in a case where the mediation server 100 determines that the setting information 42 in the MFP 10 is not to be changed (NO to T242), the mediation server 100 proceeds to T256. In T256, the mediation server 100 causes the MFP 10 to display an error screen. The error screen includes an error message indicating that the full-time connection with the SP server 400 failed to be established. In a modification, the error screen may be displayed on the terminal device 600. Due to this, by looking at the error screen, the user can for example inquire a vendor of the MFP 10 on how to receive the service of the SP server 400.

In the present embodiment as well, similar to the first embodiment, whether to update the FW 40 can be correctly determined by comparing the MFP capability information and the server capability information, and further whether to change the setting information 42 can be correctly determined (T240, T242).

Correspondence Relationship

The SP server 400 is an example of "service providing server". T250 and T254 of FIG. 6 are an example of "plurality of methods". One of T250 and T254 of FIG. 6 is an example of "specific method". The communication for establishing the full-time connection is an example of "predetermined communication."

Each of T208, T240 of FIG. 6 is an example of process realized by "receive, from the communication device via the communication interface, device capability information", "determine whether a program stored in the communication device is to be updated by comparing the device capability information received from the communication device and the server capability information stored in the memory". T240 and T242 of FIG. 6 are an example of process realized by "determine whether a specific method for the communication device communicating with the service providing server is to be executed by comparing the device capability information received from the communication device and the server capability information stored in the memory".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification 1

"Communication device" may not be limited to the MFP 10, but may be a printer, scanner, a facsimile device, a PC, or a server for example.

Modification 2

"First execution information" may not be limited to the updating screen data, but may be a latest FW itself for example. In the present modification, "screen" may be omitted.

Modification 3

The mediation server 100 may send an email including a message guiding to uploading of a FW to an email server instead of sending the uploading screen data to the MFP 10 in T100. The user may input an instruction for uploading the FW into the MFP 10 after looking at the email. In the present modification, the email and the email server are an example of "first execution information (or execution information)" and "first external device (or external device)".

Modification 4

The mediation server 100 may send an email including a message guiding to changing of the setting information 42 to an email server instead of sending the changing screen data to the MFP 10 in T130. The user may input an instruction for changing the setting information 42 into the MFP 10 by looking at the email. In the present modification, the email and the email server are an example of "second execution information (or execution information)" and "second external device (or external device)".

Modification 5

The mediation server 100 may send an email whose body includes a substitute URL to an email server instead of sending the substitute URL to the MFP 10 in T160. The user may input the substitute URL into the MFP 10 by looking at the email. In the present modification, the email and the email server are an example of "execution information" and "third external device (or external device)".

Modification 6

In the first embodiment, the processes of T52 and T54 of FIG. 2 may not be performed. Further in the second embodiment, the processes of T252 and T254 of FIG. 6 may not be performed. In the present modification, "send second execution information to a second external device via the communication interface" may be omitted.

Modification 7

The process of T56 of FIG. 2 may not be performed. In the present modification, "send information to a third external device, the information being for the communication device to communicate with the service providing server via the server" may be omitted.

Modification 8

In the first embodiment, the processes of T30 and T32 of FIG. 2 may not be performed. Also, in the second embodiment, the processes of T210 and T212 of FIG. 6 may not be performed. For example, the mediation server 100 may obtain the server capability information in advance from the SP server 200 or 400 before the process of FIG. 2 or FIG. 6 is started.

Modification 9

For example, in a case where a number of the service(s) the user uses is one, the failure notification in T28 may not include a service name. In the present modification, "service identification information" may be omitted.

Modification 10

In the first embodiment, one process may be selected from among the two processes of T54 and T56. Alternatively, one process may be selected from among the two processes of T50 and T56.

Modification 11

In each of the above embodiments, the respective processes of FIGS. 2 to 6 are realized by the CPU 132 executing the program 140. Instead of this, any of the processes may be realized by hardware such as a logic circuitry.

What is claimed is:
1. A server, comprising:
  a communication interface configured to communicate with a communication device;
  a memory configured to store server capability information indicating a communication capability of a service providing server, the service providing server being configured to provide a predetermined service to the communication device and being different from the server; and a controller configured to:

receive, from the communication device via the communication interface, device capability information indicating a communication capability of the communication device;

determine whether a program stored in the communication device is to be updated by comparing the device capability information received from the communication device and the server capability information stored in the memory; and in a case where it is determined that the program is to be updated, send first execution information to a first external device via the communication interface, the first execution information being for causing the communication device to execute a process of updating the program.

2. The server according to claim 1, wherein the first execution information is for causing the communication device to display a screen that guides installation of the program.

3. The server according to claim 1, wherein the device capability information includes at least one from a group of:

information indicating a version of a communication protocol used in communicating with the service providing server;

information indicating a cipher suite used in communicating with the service providing server; and digital certificate information used in communicating with the service providing server.

4. The server according to claim 1, wherein the controller is further configured to:

in a case where it is not determined that the program is to be updated, send second execution information to a second external device via the communication interface, the second execution information being for changing a communication setting of the communication device.

5. The server according to claim 4, wherein the communication setting changed according to the second execution information is at least one of a plurality of settings including:

a version of a communication protocol used in communicating with the service providing server;

a cipher suite used in communicating with the service providing server; and a digital certificate used in communicating with the service providing server.

6. The server according to claim 1, wherein the controller is further configured to:

in a case where it is not determined that the program is to be updated, send information to a third external device, the information being for the communication device to communicate with the service providing server via the server.

7. The server according to claim 1, wherein the controller is further configured to:

in a case where a predetermined communication between the communication device and the service providing server fails, receive the server capability information from the service providing server and store the server capability information in the memory.

8. The server according to claim 1, wherein the controller is configured to receive service identification information from the communication device via the communication interface, and the controller is configured to determine whether the program is to be updated by comparing the device capability information received from the communication device and the server capability information indicating a communication capability of the service providing server that is identified by the service identification information received from the communication device.

9. A server, comprising:

a communication interface configured to communicate with a communication device;

a memory configured to store server capability information indicating a communication capability of a service providing server, the service providing server being configured to provide a predetermined service to the communication device and being different from the server; and a controller configured to:

in a case where a predetermined communication between the communication device and the service providing server fails, receive, from the communication device via the communication interface, device capability information indicating a communication capability of the communication device;

determine whether a specific method for the communication device communicating with the service providing server is to be executed by comparing the device capability information received from the communication device and the server capability information stored in the memory; and in a case where it is determined that the specific method is to be executed, send execution information to an external device via the communication interface, the execution information being for causing the communication device to execute the specific method.

10. The server according to claim 9, wherein the device capability information includes at least one from a group of:

information indicating a version of a communication protocol used in communicating with the service providing server;

information indicating a cipher suite used in communicating with the service providing server; and digital certificate information used in communicating with the service providing server.

11. The server according to claim 9, wherein the specific method is a method of changing a communication setting of the communication device.

12. The server according to claim 11, wherein the communication setting changed according to the execution information is at least one from a group of settings including:

a version of a communication protocol used in communicating with the service providing server;

a cipher suite used in communicating with the service providing server; and a digital certificate used in communicating with the service providing server.

13. The server according to claim 9, wherein the specific method is a method for the communication device to communicate with the service providing server via the server.

14. The server according to claim 9, wherein the controller is configured to select the specific method from among a plurality of methods for the communication device to communicate with the service providing server by comparing the device capability information and the server capability information, and the plurality of methods includes at least two from a group of:

a method of updating a program stored in the communication device;

a method of changing a communication setting of the communication device; and a method for the communication device to communicate with the service providing server via the server.

15. The server according to claim 9, wherein the controller is further configured to:

in the case where the predetermined communication fails, receive the server capability information from the service providing server and store the server capability information in the memory.

16. The server according to claim 9, wherein the controller is configured to further receive service identification information from the communication device via the communication interface, and the controller is configured to determine whether the specific method is to be executed by comparing the device capability information received from the communication device and the server capability information indicating a communication capability of the service providing server which is identified by the service identification information received from the communication device.

17. A non-transitory computer-readable recording medium storing computer-readable instructions for a server, wherein the server comprises:

a communication interface configured to communicate with a communication device;

a memory configured to store server capability information indicating a communication capability of a service providing server, the service providing server being configured to provide a predetermined service to the communication device and being different from the server; and a processor, wherein the computer-readable instructions, when executed by the processor, cause the server to:

receive, from the communication device via the communication interface, device capability information indi cating a communication capability of the communication device;

determine whether a program stored in the communication device is to be updated by comparing the device capability information received from the communication device and the server capability information stored in the memory; and in a case where it is determined that the program is to be updated, send first execution information to a first external device via the communication interface, the first execution information being for causing the communication device to execute a process of updating the program.

18. A non-transitory computer-readable recording medium storing computer-readable instructions for a server, wherein the server comprises:

a communication interface configured to communicate with a communication device;

a memory configured to store server capability information indicating a communication capability of a service providing server, the service providing server being configured to provide a predetermined service to the communication device and being different from the server; and a processor, wherein the computer-readable instructions, when executed by the processor, cause the server to:

in a case where a predetermined communication between the communication device and the service providing server fails, receive, from the communication device via the communication interface, device capability information indicating a communication capability of the communication device;

determine whether a specific method for the communication device communicating with the service providing server is to be executed by comparing the device capability information received from the communication device and the server capability information stored in the memory; and in a case where it is determined that the specific method is to be executed, send execution information to an external device via the communication interface, the execution information being for causing the communication device to execute the specific method.

*     *     *     *     *